United States Patent
Venkitaraman et al.

(10) Patent No.: US 7,561,553 B2
(45) Date of Patent: Jul. 14, 2009

(54) METHOD AND APPARATUS FOR PROVIDING IP MOBILITY FOR MOBILE NETWORKS AND DETACHABLE MOBILE NETWORK NODES

(75) Inventors: Narayanan Venkitaraman, Hoffman Estates, IL (US); Adam C. Lewis, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 1586 days.

(21) Appl. No.: 10/083,890

(22) Filed: Feb. 27, 2002

(65) Prior Publication Data

US 2003/0161287 A1 Aug. 28, 2003

(51) Int. Cl.
*H04W 4/00* (2006.01)
*H04L 12/28* (2006.01)
*H04L 12/56* (2006.01)
(52) U.S. Cl. ...................................... 370/338; 370/401
(58) Field of Classification Search ......... 370/254–255, 370/310, 328, 338, 351, 389, 392, 400, 401, 370/410, 464, 498, 522, 345, 349, 399.54; 709/238–242; 455/422, 517
See application file for complete search history.

(56) References Cited

U.S. PATENT DOCUMENTS

| | | | |
|---|---|---|---|
| 5,910,951 A | 6/1999 | Pearce et al. | |
| 6,195,705 B1 * | 2/2001 | Leung | 709/245 |
| 6,198,920 B1 | 3/2001 | Doviak et al. | |
| 6,230,012 B1 | 5/2001 | Willkie et al. | |
| 6,625,135 B1 * | 9/2003 | Johnson et al. | 370/332 |
| 6,697,355 B1 * | 2/2004 | Lim | 370/352 |
| 6,959,341 B1 * | 10/2005 | Leung | 709/250 |
| 6,992,995 B2 * | 1/2006 | Agrawal et al. | 370/328 |
| 2001/0046223 A1 * | 11/2001 | Malki et al. | 370/338 |
| 2002/0009066 A1 * | 1/2002 | Shimizu et al. | 370/338 |
| 2002/0061009 A1 * | 5/2002 | Sorensen | 370/351 |
| 2002/0068570 A1 * | 6/2002 | Abrol et al. | 455/438 |
| 2002/0075807 A1 * | 6/2002 | Troxel et al. | 370/238 |
| 2002/0098840 A1 * | 7/2002 | Hanson et al. | 455/435 |
| 2002/0150062 A1 * | 10/2002 | Zheng et al. | 370/331 |

(Continued)

OTHER PUBLICATIONS

David B. Johnson and Charles Perkins, Mobility Support in Ipv6, Internet Draft, Jul. 2, 2000, 122 pages, Nokia Research Center.

(Continued)

*Primary Examiner*—Kevin C Harper
(74) *Attorney, Agent, or Firm*—Randi L. Karpinia

(57) ABSTRACT

An IP mobility solution for mobile network(s) (110) defining mobile routers (112) detachably connected to one or more mobile nodes (116). When attached to the router, the nodes create a binding between their home address and a home address of their attached router. The router creates a binding between its mobile subnet prefix (or home address) and a care of address. The bindings are sent to various correspondent nodes (126) having sent packets to the nodes. The bindings are updated, as appropriate, responsive to movement of the mobile network to other networks, including other mobile networks, and/or responsive to the nodes detaching from the mobile network and roaming independently to other networks, including other mobile networks. The correspondent nodes store the bindings and updates, if any, in a binding cache (208) and consult the binding cache to determine how packets should be directed on next attempt(s) to reach the node.

14 Claims, 13 Drawing Sheets

U.S. PATENT DOCUMENTS

| | | | | |
|---|---|---|---|---|
| 2002/0191576 | A1* | 12/2002 | Inoue et al. | 370/338 |
| 2003/0016655 | A1* | 1/2003 | Gwon | 370/352 |
| 2003/0084293 | A1* | 5/2003 | Arkko et al. | 713/168 |
| 2003/0095523 | A1* | 5/2003 | Korus et al. | 370/338 |
| 2003/0117965 | A1* | 6/2003 | Markki et al. | 370/254 |

OTHER PUBLICATIONS

Ahmed Helmy, A Multicast-based Protocol for IP Mobility Support, 17 pages, Electrical Engineering Department, University of Southern California, helmy@ceng.usc.edu.

Soliman, Castelluccia, El-Malki, Bellier, Hierarchical MIPv6 Mobility Management (HMIPv6), Internet Draft, Jul. 2001, 32 pages.

G. Dommety, A. Yegin, C. Perkins, G. Tsirtsie, K. El-Malki, M. Khalil, Fast Handovers for Mobile Ipv6, Internet Draft, Jul. 2001, 69 pages, Working Group of the Internet Engineering Task Force (IETF).

T. Ernst, L. Bellier, A. Olivereau, C. Castelluccia, H. Lach, Mobile Networks Support in Mobile Ipv6 (Prefix Scope Binding Updates), Internet Draft, Jun. 22, 2001, 23 pages, Motorola Labs and INRIA Planete, France.

T. Ernst, C. Castelluccia and H. Lach, Extending Mobile-Ipv6 with Multicast to Support Mobile Networks in Ipv6, 8 pages, Motorola Labs, Paris.

H. Chaskar, Requirements of a QoS Solution for Mobile IP, Internet Draft, Aug. 20, 2001, 8 pages, Nokia Research Center.

* cited by examiner

METHOD AND APPARATUS FOR PROVIDING IP MOBILITY FOR MOBILE NETWORKS AND DETACHABLE MOBILE NETWORK NODES

CROSS-REFERENCE TO RELATED APPLICATIONS

This invention is related to U.S. patent application Ser. No. 09/993,255, titled "Method and Apparatus for Providing IP Mobility for Mobile Networks," filed Nov. 19, 2001, assigned to the assignee of the present invention and incorporated herein by reference in its entirety.

FIELD OF THE INVENTION

This invention relates generally to mobile networks, and, more particularly, to a method and apparatus for providing Internet Protocol (IP) mobility support for mobile networks and for mobile network nodes detachable from the mobile networks.

BACKGROUND OF THE INVENTION

Many communication systems use Internet Protocol (IP) to transport packet data representative of voice, video, data or control traffic between endpoints (or "hosts" in IP terminology). In such systems, the data is divided into IP packets called datagrams that include addressing information (e.g., source and destination addresses) that enables various routers forming an IP network to route the packets to the specified destination. The destination address may comprise a unicast address identifying a particular host or a multicast address shared by a group of hosts. Typically, the hosts include various fixed devices and mobile wireless devices, often called mobile nodes, that are capable of roaming from site to site or even between different communication networks that use IP.

As wireless communication and mobile internet access have grown in popularity, it is envisioned that multiple IP-addressable devices will be carried within a car, airplane, train or even on a person. Such a collection of devices is known as a mobile network and the IP-addressable devices residing within the mobile network are known as mobile network nodes. Further, it is envisioned that certain mobile network nodes will periodically detached from a mobile network, thereby becoming independent mobile nodes. This may occur, for example, when a mobile wireless device carried by a policeman (i.e., forming part of a mobile network when carried within a police vehicle) becomes an independent mobile node when the device is removed from the vehicle. A need has arisen to provide for IP mobility of the mobile network as well as mobile network nodes detachable from the mobile network, that is to maintain IP connectivity for the mobile network and for any mobile network nodes that are detached from the mobile network as it (and they) may move from site to site.

The most recent IP standard, Internet Protocol version 6, called "IPv6," supports IP mobility for individual mobile nodes (presently defined in "draft-ietf-mobileip-ipv6-14.txt") but does not address mobile networks or the special case of mobile nodes having detached from mobile networks. Generally, mobile IPv6 provides for a mobile node to move to different sites or networks without changing its IP address. A mobile node is always addressable by its "home" IP unicast address associated with a home site or network, regardless of the node's current point of attachment to the network infrastructure. While situated away from its home network, the mobile node is also associated with a forwarding address known as a "care of" address. The mobile node is addressable either directly by the care of address or indirectly by the home address. In the latter case, the IPv6 protocol causes packets addressed to the home address to be intercepted by a "home agent" and tunneled to the care of address.

To that end, mobile IPv6 relies upon individual mobile nodes performing mobility management, i.e., recognizing when they are at a foreign site and, in such case, to inform their home agent of their new care of address. This is accomplished by messages termed "binding updates." Mobile nodes may also send binding updates to various devices (termed "correspondent nodes") corresponding (or prospectively corresponding) with the mobile nodes. In such case, the mobile node maintains a binding list identifying which correspondent nodes should receive binding updates.

A problem that arises is that, in the case of mobile networks, it is generally undesirable to place all mobility management responsibility in the mobile network nodes because the mobile nodes, while attached to the mobile network, appear from their point of view to be stationary and may be unaware of movements of the mobile network within the external network. Consequently, it is impractical to burden mobile network nodes with the responsibility to detect movement of the mobile network. Moreover, if one were to place all mobility management in the mobile nodes, binding update "storms" may result upon multiple mobile network nodes simultaneously sending binding update messages each time the mobile network moved to a new site or network. As will be appreciated, binding update storms create network traffic overhead that can adversely affect handoff times and quality of service of the network.

To address this problem, related patent application Ser. No. 09/993,255 provides a method and apparatus whereby mobility management responsibility for a mobile network is placed entirely in a mobile router on behalf of its attached mobile network nodes. In such manner, the mobile router, rather than mobile nodes, detects movement of the mobile network and sends any required binding updates to home agents and correspondent nodes. A problem with this approach, however, is that if and when a mobile network node detaches from the mobile network and roams to another mobile network or fixed network (and hence must perform mobility management on its own behalf), the mobile network node will not know which correspondent nodes to send binding updates to because it will not have performed any mobility management on its own behalf while attached to the mobile network and thus will not have maintained a binding list.

Accordingly, there is a need for a method and apparatus for providing IP mobility for mobile networks that better supports IP mobility for detachable mobile nodes of the mobile network. Advantageously, the method and apparatus will place the majority of mobility management responsibility in a mobile router so as to reduce or eliminate the likelihood of binding update storms and so that mobile network nodes, while attached to the mobile router, need not be aware of movement of the mobile network, yet place enough mobility management responsibility to mobile nodes, on their own behalf, to facilitate their ability to perform mobility management when detached from the mobile router. The present invention is directed to satisfying these needs.

BRIEF DESCRIPTION OF THE DRAWINGS

The foregoing and other advantages of the invention will become apparent upon reading the following detailed description and upon reference to the drawings in which.

DESCRIPTION OF PREFERRED EMBODIMENTS

Figure 1:
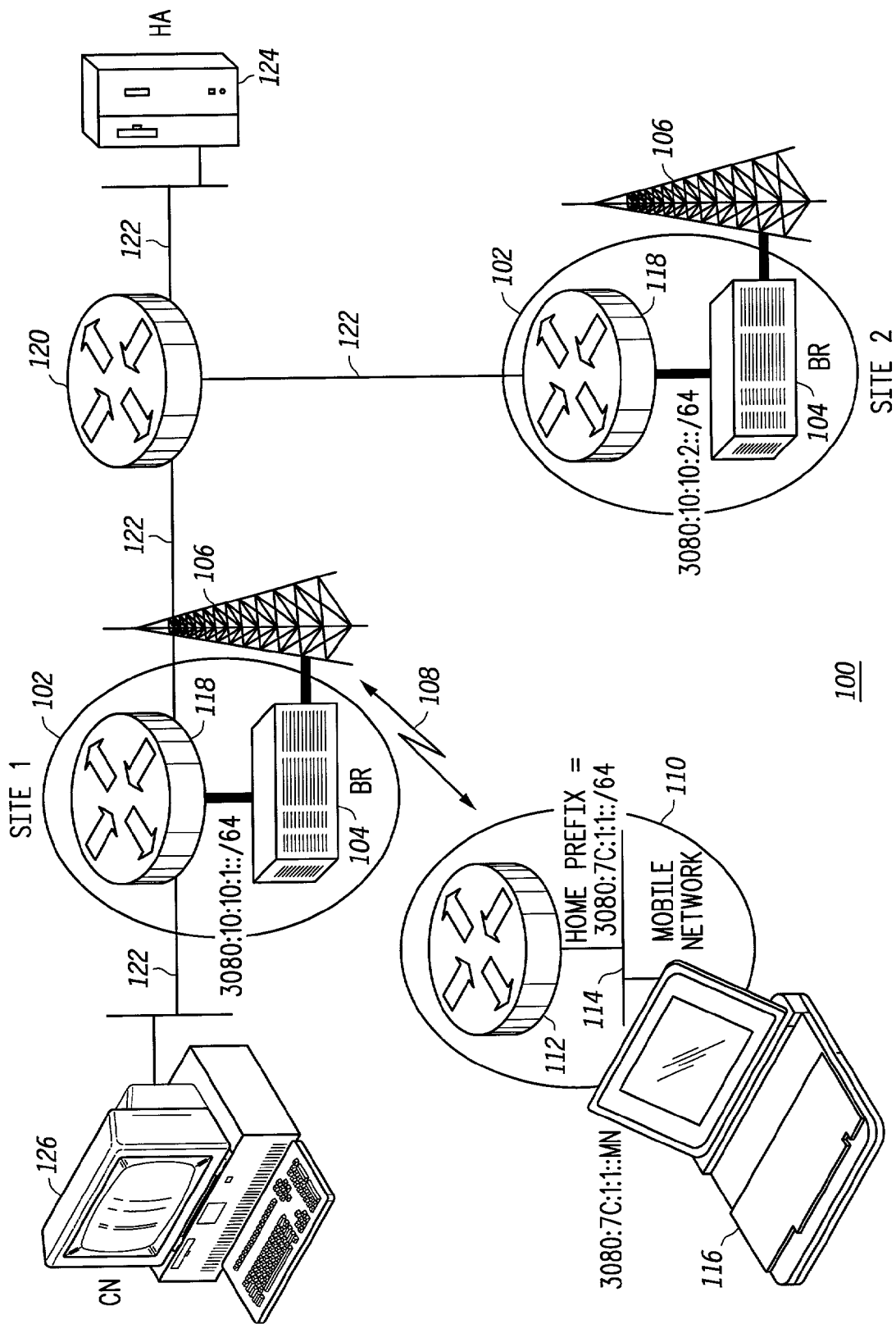
FIG. 1 is a block diagram showing an example multi-site communication system incorporating mobile networks and detachable mobile network nodes according to the present invention.

FIG. 1 shows by way of example and not limitation, a packet-based communication system 100 comprising a plurality of sites 102 (two shown, denoted "site 1" and "site 2"). The sites 102 include respective base radios ("BRs") 104 (sometimes called base stations) and antennas 106 for exchanging information, such as voice, video, or data traffic ("payload information") or control signaling ("control information") via radio frequency (RF) resources 108 with various communication devices, mobile networks or mobile nodes within their respective coverage areas. The RF resources 108 may comprise, for example, narrow band frequency modulated channels, wideband modulated signals, broadband modulated signals, time division modulated slots, carrier frequencies, frequency pairs, or generally any medium for communicating payload or control information to and from the sites 102. As will be appreciated, the RF resources 108 may differ from site to site and/or multiple RF access technologies may be used at certain site(s).

As shown, site 1 is communicating via RF resources 108 with a mobile network 110. The mobile network 110 comprises a mobile router ("MR") 112 attached by links 114 to one or more mobile network nodes 116 (one shown). The mobile network nodes 116 comprise IP-addressable devices including, but not limited to, laptop computers, wireless mobile or portable two-way radios, cell phones, personal digital assistants (PDAs) and the like. The links 114 are logical links that may be physically realized by wireline (e.g., Ethernet local area network (LAN)) or wireless (e.g., Bluetooth) links.

The sites 102 are logically coupled, via site routers 118 to a "core router" 120 of the communication system 100. The site routers and core routers are logically connected via packet network links 122. As will be appreciated, the site routers and core routers are functional router elements that may be embodied in separate physical devices or combinations of such devices. Generally, the site routers and core routers comprise specialized or general purpose computing devices configured to receive packets from a particular host in the communication system 100 and relay the packets to other router(s) or host(s) in the communication system 100.

In the preferred embodiment, packets are distributed between hosts from point-to-point using internet protocol (IP) unicast routing protocols or from point-to-multipoint (i.e., to groups of hosts) using IP multicast routing protocols. In one embodiment, routing is based on the IPv6 subnet prefix in a packet's destination IP address. Without specific support for mobility in IPv6, packets destined to a mobile node (host or router) would not be able to reach it while the mobile node is away from its "home" link (the link on which its "home" IPv6 subnet prefix is in use). In order to continue communication in spite of its movement, mobile-IPv6 provides for the mobile node receiving a proxy address known as a care of address when it moves to a new link. In such case, the mobile node is addressable by its care of address (and indirectly, by its home address) after moving to a new link.

In one embodiment, the communication system 100 supports hierarchical mobile IPv6 in which mobile nodes obtain a local care of address (termed an "LCoA") as well as a regional care of address (termed an "RCoA"). In one embodiment, mobile network nodes use a unique unicast address as an LCoA and a home address of their attached mobile router/network as an RCoA. The RCoA is shared by all other attached mobile network nodes. In one embodiment, where mobile network nodes are attached to their home network (as is the case of mobile network node 116 in FIG. 1), the mobile network node may use its home address as its LCoA. As will be appreciated, however, mobile nodes may obtain any number of care of address, which may comprise unicast or multicast addressess and may comprise other than a hierarchical mobile IP addresses.

In the example shown in FIG. 1, the internal interface of the mobile router 112 (i.e., the one connecting to the mobile network node 116) has a subnet prefix 3080:7C:1:1::/64. The home address of the mobile network node 116 is 3080:7C:1:1::MN and the home address of the mobile network router is 3080:7C:1:1::MR. Thus, as shown, the mobile network node 116 is attached its home link. The external interface of the mobile router is connected to the site 1 router, having a subnet prefix 3080:10:10:1::/64. The care of address of the mobile router is 3080:10:10:1::MR. The site 2 router has a subnet prefix 3080:10:10:2::/64.

As shown, the core router 120 is connected to a home agent (or "HA") 124 for the mobile network 110 and the site router 118 of site 1 is connected to a fixed correspondent node (or "CN") 126, via packet network links 122. The home agent 124 is a router element that registers the current care of address of mobile nodes (e.g., the mobile router 112 and mobile network node 114) and, responsive to mobility of a mobile node, intercepts packets destined to the mobile node's home address, encapsulates them, and tunnels them to the mobile node's registered care of address. The care of address may comprise a multicast or unicast address. A mobile node may have both multicast and unicast care of addresses.

The correspondent node 126 is a peer node with which the mobile networks or nodes are communicating (or prospectively communicating). Correspondent nodes may be fixed, as shown (i.e., attached to a fixed site router or core router) or mobile (i.e., independently mobile or attached to a mobile router). The home agent 124 is a special case of correspondent node that performs home agent functions for the mobile router 112 and/or mobile network node 116 as described above.

In the illustrated embodiment, the mobile network node 116 is attached to the mobile router 112 (forming mobile network 110) which, in turn, is in communication with site 1. Generally, the mobile network 110 (and hence the mobile router 112 and attached mobile network node 116) is eligible to move from site to site coincident with movement of a carrier vehicle or person (not shown). As the mobile network 110 moves from site to site, the mobile router 112 uses appropriate external network interface(s) (not shown) to communicate with the visited site. The mobile router 112 may also attach to different mobile networks. For example, the mobile router 112 (and hence the mobile network 110) may detach from site 1 and attach to a mobile router of a second mobile network (not shown), in effect causing the mobile router 112 to become a mobile network node of the second mobile network. The second mobile network, in turn, may attach to a third mobile network, and so forth.

In the preferred embodiment, the mobile network node 116, for the time of its attachment to the mobile router 112, knows that it is mobile (because of its attachment to mobile router 112) but otherwise does not know its location relative to the network as a whole. Thus, in the present example, the mobile network node 116 does not recognize that it attached (as a part of mobile network 110) to site 1. If, while the mobile network node 116 is attached to the mobile network 110, the mobile network 110 should roam to another site (e.g., site 2) or another mobile network (not shown), the mobile network node 116 similarly will know only that it is attached to the mobile router 112, not that it has relocated (as a part of mobile network 110) to a different site.

The present invention contemplates that the mobile network node 116 may periodically detach from the mobile router 112 and roam independently from the mobile network 110 to other sites (e.g., site 2) or other mobile networks (not shown). In such case, the mobile node 116 must perform mobility management on its own behalf, i.e., recognize when it has moved to a foreign site and inform its correspondent node(s) of its new location. To facilitate the mobile node performing mobility management on its own behalf when detached from the mobile network, the present invention places some mobility management responsibility onto the mobile network node while attached to the mobile router yet, at the same time, places the majority of mobility management responsibility in the mobile router.

Generally, this is accomplished by the mobile network nodes sending binding updates to correspondent nodes identifying their point of attachment to the mobile network (or, if detached from the mobile network, their point of attachment to a foreign site or foreign mobile network). The mobile node maintains a binding list of correspondent nodes to which it has sent binding updates. The mobile router, upon receiving packets destined for an attached mobile network node, sends binding updates to the correspondent nodes identifying its location (and hence the mobile network node's location) in the overall network. The correspondent node stores this binding information in memory, defining a "binding cache" and, when desiring to send packets to the mobile network node, performs a recursive lookup to determine first that the packets should be directed to the mobile network and second, to identify a care of address to which packets should be directed to reach the mobile network. This process will be described in greater detail in relation to FIGS. 3-10.

Figure 2:
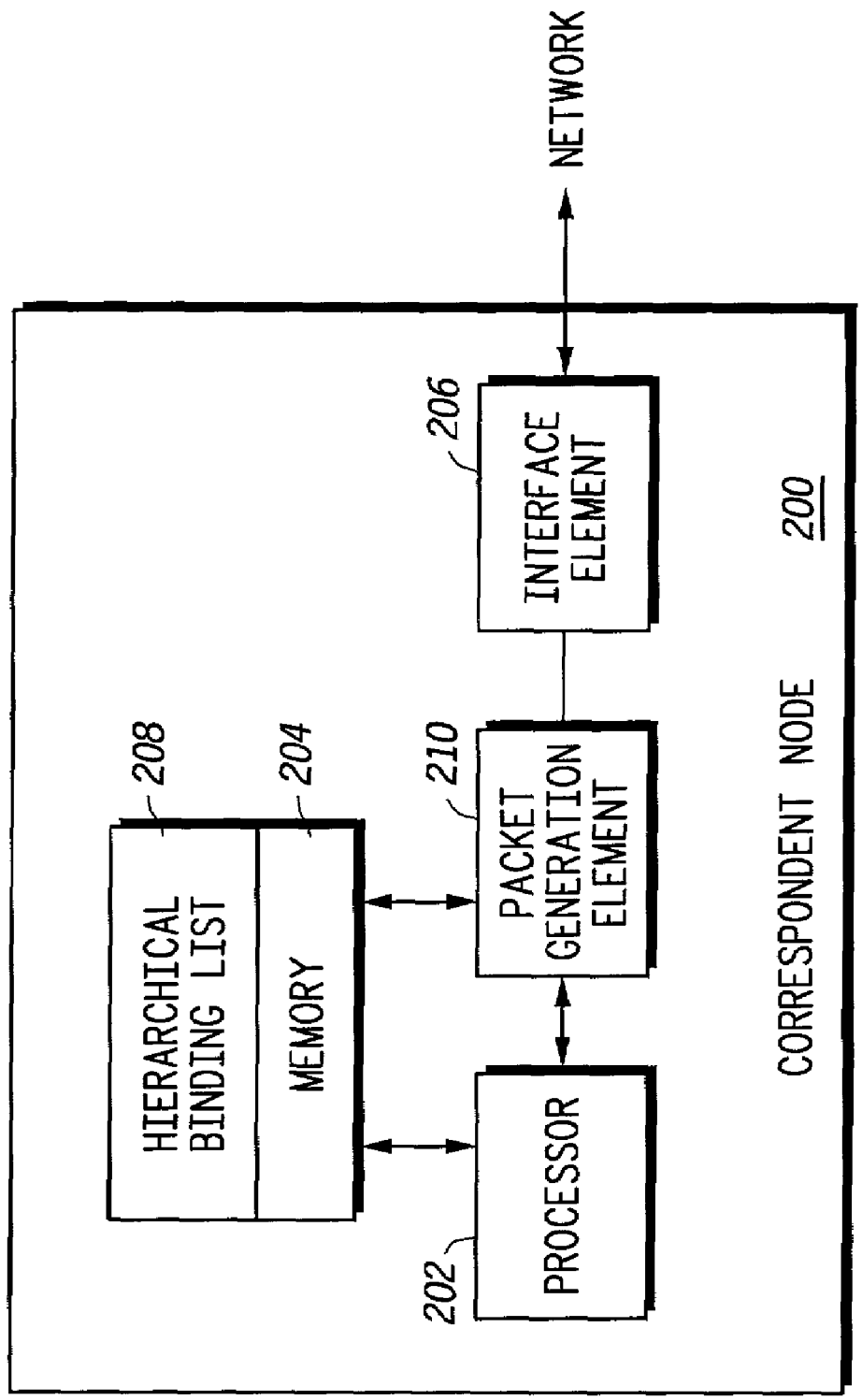
FIG. 2 is a block diagram of a correspondent node according to the present invention.

Turning now to FIG. 2, there is shown a block diagram of a correspondent node 200 operable to implement the present invention. The elements of FIG. 2 are functional elements that may be embodied in one or more physical components or devices. The correspondent node 200 includes a processor element 202 (which may comprise, for example, microprocessors, microcontrollers, digital signal processors or combination of such devices) and a memory 204 (which may comprise, for example, volatile or non-volatile digital storage devices or combination of such devices). An external interface element 206 logically connects the correspondent node to the external IP network. The external interface 206 may comprise a wireline or wireless access technology interface. Generally, as has been described with respect to correspondent node 126 (FIG. 1), the correspondent node 200 may be fixed or mobile. In the case where the correspondent node 200 is fixed, the external interface 206 may connect the correspondent node 200 to a fixed site router or core router. In the case where the correspondent node 200 is part of a mobile network, the external interface 206 connects the correspondent node to a mobile router associated with the mobile network. In the case where the correspondent node 200 is independently mobile, the external interface 206 may wirelessly connect the correspondent node 200 to a visited site or network.

A binding list 208 (hereinafter termed "binding cache") includes binding information collected from mobile network node(s) and mobile router(s) which, as described generally above, enable the processor 202 to determine how packets should be addressed to reach various mobile network nodes. As will become more apparent in relation to FIGS. 6-10 and 13, the binding cache may include nested (or hierarchical) entries for certain mobile nodes, in which case the correspondent node performs a recursive lookup to determine one or more nested addresses for reaching such nodes.

A packet generation element 210 is operable to construct mobile IPv6 packet headers for packets directed to certain mobile nodes. The packet headers may include nested addresses identified from the binding cache, as will be described in greater detail in relation to FIG. 13 and FIG. 14.

FIGS. 3-10 show an example sequence of messages and binding information exchanged between host devices in the communication system of FIG. 1.

Figure 3:
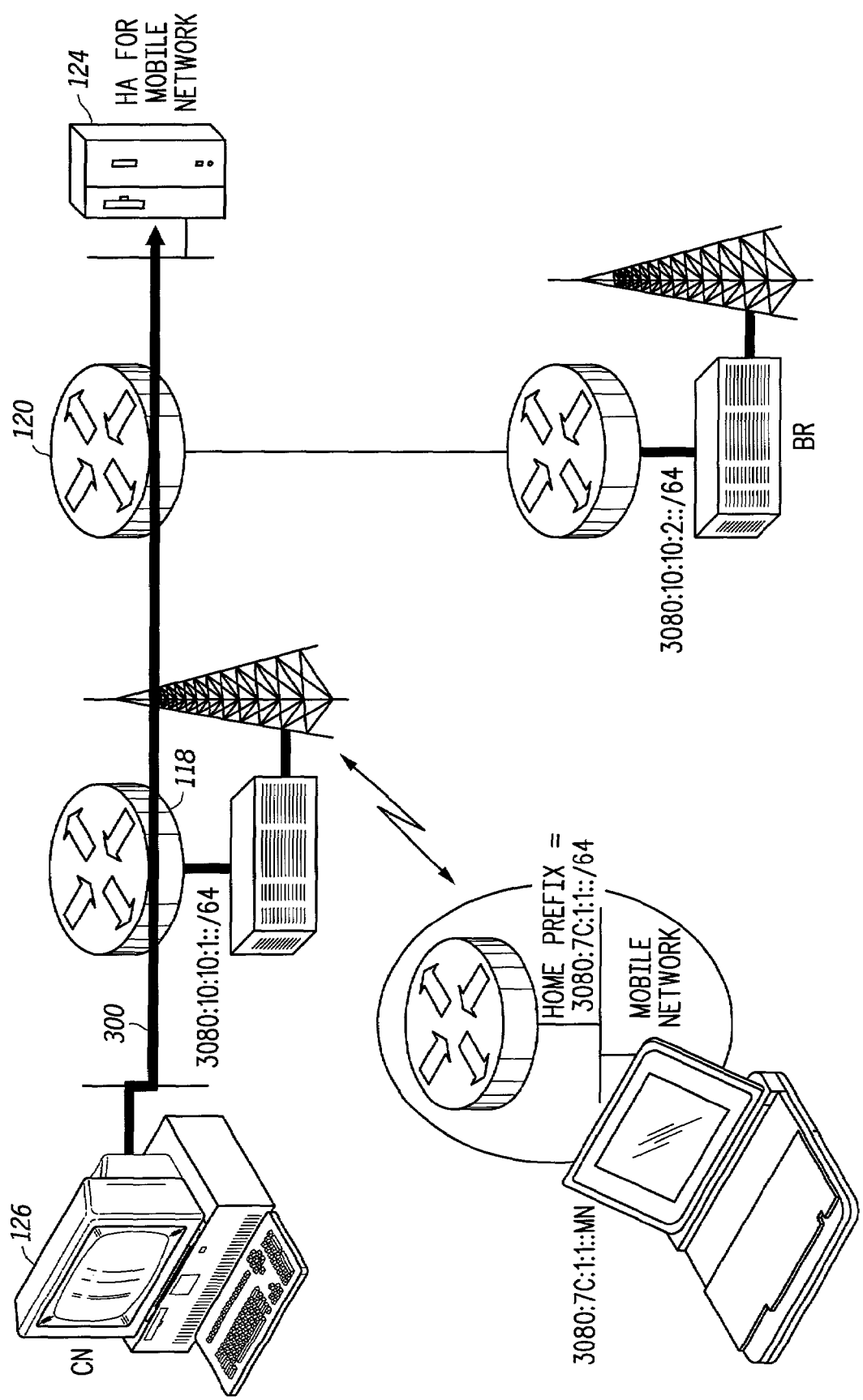
FIGS. 3-10 portray an example sequence of messages and binding information exchanged between host devices in the communication system of FIG. 1.

Turning initially to FIG. 3, the CN 126 first attempts to send a message 300 comprising one or more IP packets to the mobile network node 116. Generally, in the case where the CN 126 communicates for the first time with the mobile network node (or has not communicated recently enough to know how to optimally reach the mobile network node), the CN will create standard IP packet(s) and send the packets to the host's home address. The packet(s) 300 will include a source address field including the unicast IP address of the sourcing CN and a destination address field including the unicast IP address of the targeted mobile network node. Thus, on this first attempt the CN 126 directs the packets 300 to the home address (3080:7C:1:1::MN) of the mobile network node, where they are intercepted by the Home Agent ("HA"). (The correspondent node 126 does not know yet that the mobile network node is attached to the mobile router 112 or that the point of attachment of the mobile router 112 to the external network 100 is via the site 1 router).

Figure 4:
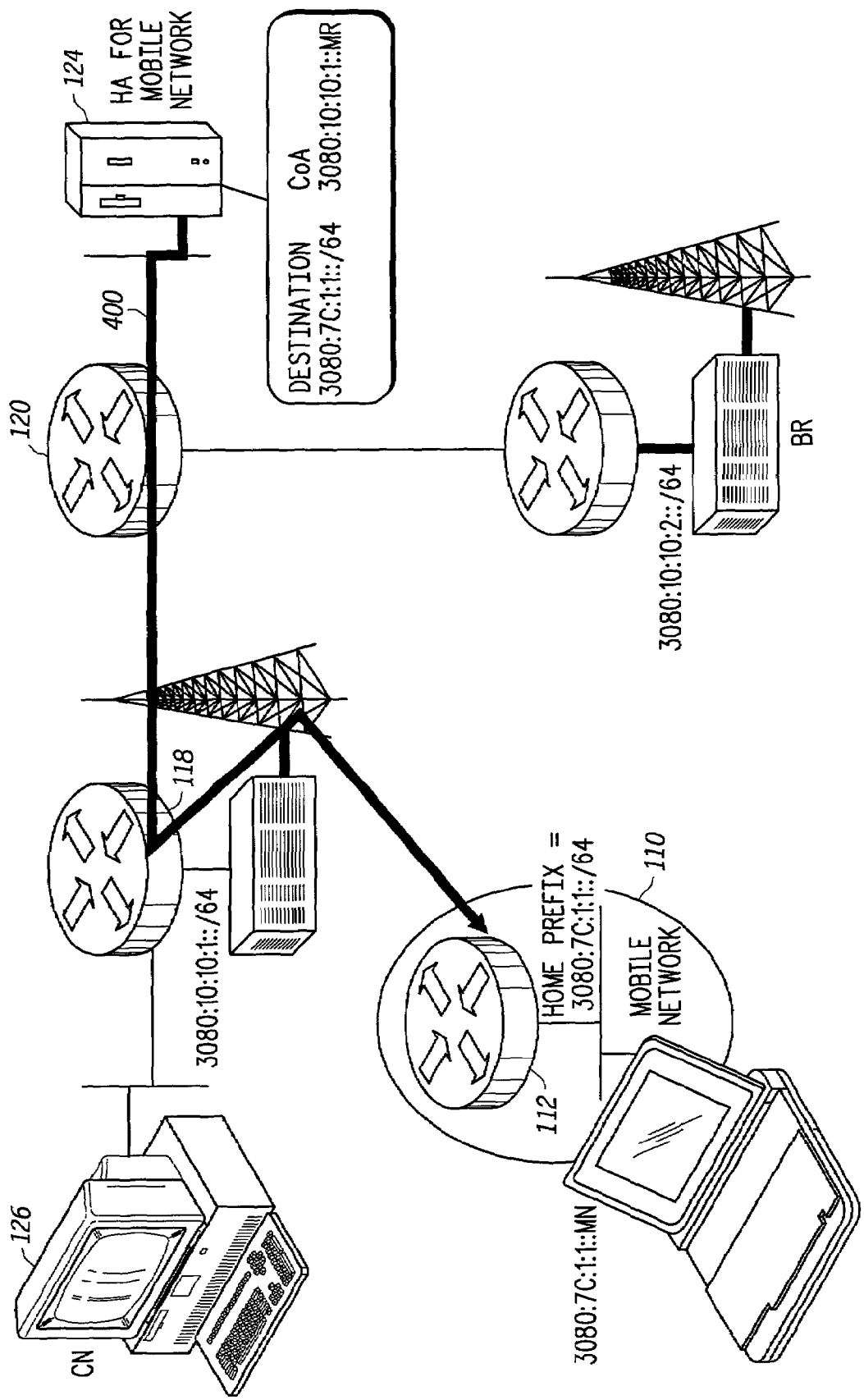

Next, as shown in FIG. 4, having intercepted the packets 300 directed to the home address (3080:7C:1:1::MN) of the mobile network node, the HA searches its binding cache to find the mobile network node's subnet (3080:7C:1:1::/64) bound to the care of address 3080:10:10:1::MR (i.e., the mobile router's home address), thereby indicating that the mobile network node is reachable via the mobile router/network presently attached to site 1. In one embodiment, this care of address comprises an RCoA under hierarchical mobile IP. (Here, it is presumed the HA has received binding information indicating the CoA of the mobile network node prior to receiving the packets 300 from the CN). The HA will then encapsulate the original IP packet(s) in a new outer IPv6 header (not shown) indicating the HA as the source and the care of address 3080:10:10:1::MR (i.e., the mobile router's home address) as the destination address. The encapsulated packets 400 are then tunneled to the MR via the site 1 router.

Figure 5:
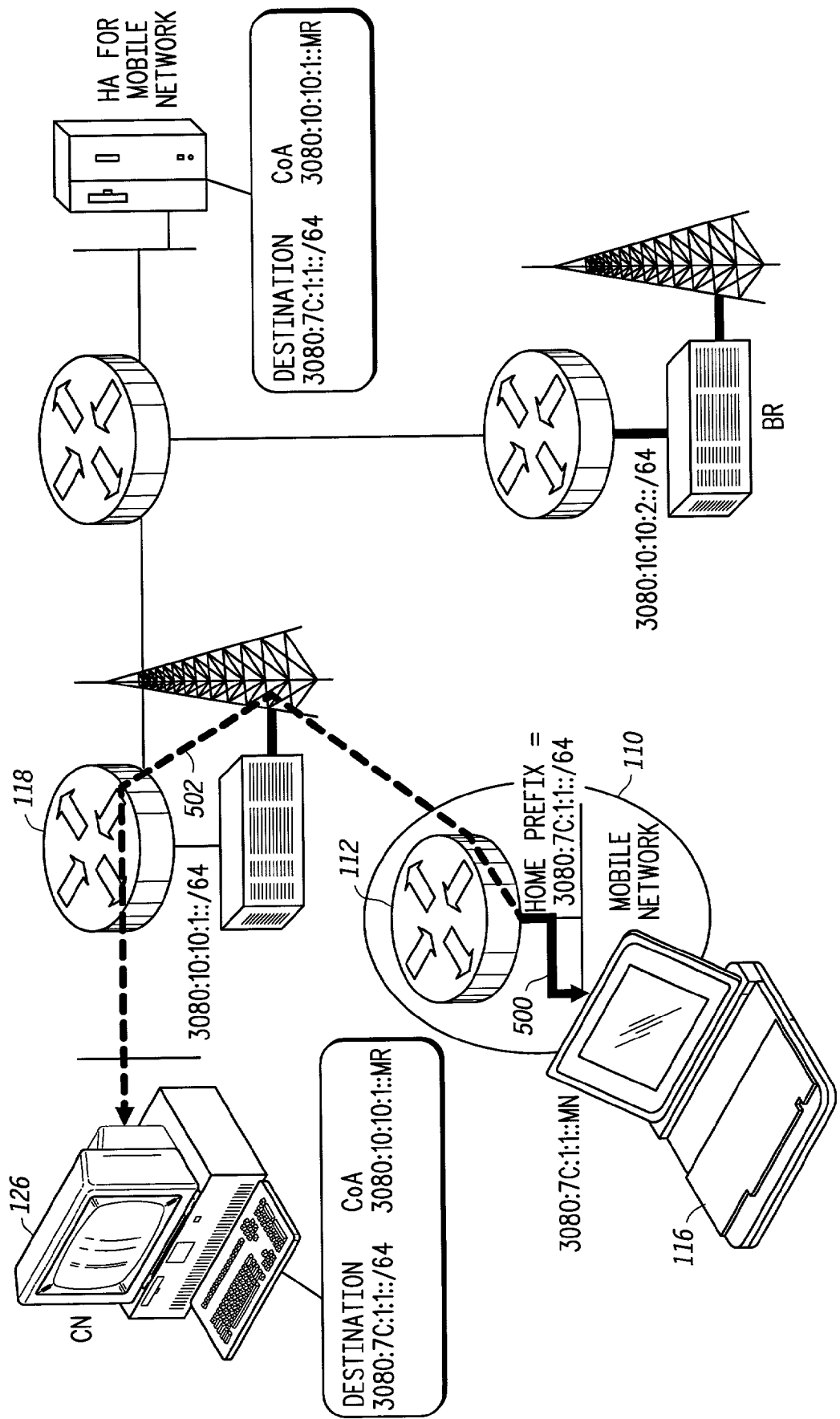

FIG. 5 shows various messages initiated by the mobile router 112 upon receiving the packets 400 tunneled from the home agent. The mobile router will determine that the packets 400 were tunneled (i.e., routed non-optimally from the CN to the mobile router) by detecting the presence of the outer IP header from the home agent. The mobile router removes the outer IPv6 header of the tunneled packets, yielding an inner IP header having the source address of the CN and the destination address (3080:7C:1:1::MN) of the targeted mobile network node 116. The mobile router again encapsulates the packets in a new outer IPv6 header (not shown) indicating the MR as the source and 3080:7C:1:1::MN as the destination address. The encapsulated packets 500 are then sent to the mobile network node 116.

In one embodiment, the mobile router uses the hierarchical mobile IP LCoA of the mobile network node as the destination address. In the present example (i.e., where the mobile network node is on its home subnet), the LCoA of the mobile network node is the same as its home address. Where the mobile network node is away from its home address, its LCoA will differ from its home address.

Additionally, the mobile router 112 sends a binding update 502 to the CN mapping the subnet prefix (3080:7C:1:1::/64) of the mobile network to the care of address 3080:10:10:1:: MR so that future packets directed to the mobile network from the CN may travel the shortest tree and avoid the overhead of tunneling. Alternatively, the binding update 502 may map the home address of the mobile router to its care of address. The CN stores this information in its binding cache. (The CN does not know yet that the mobile network node is attached to the mobile router/network).

Figure 6:
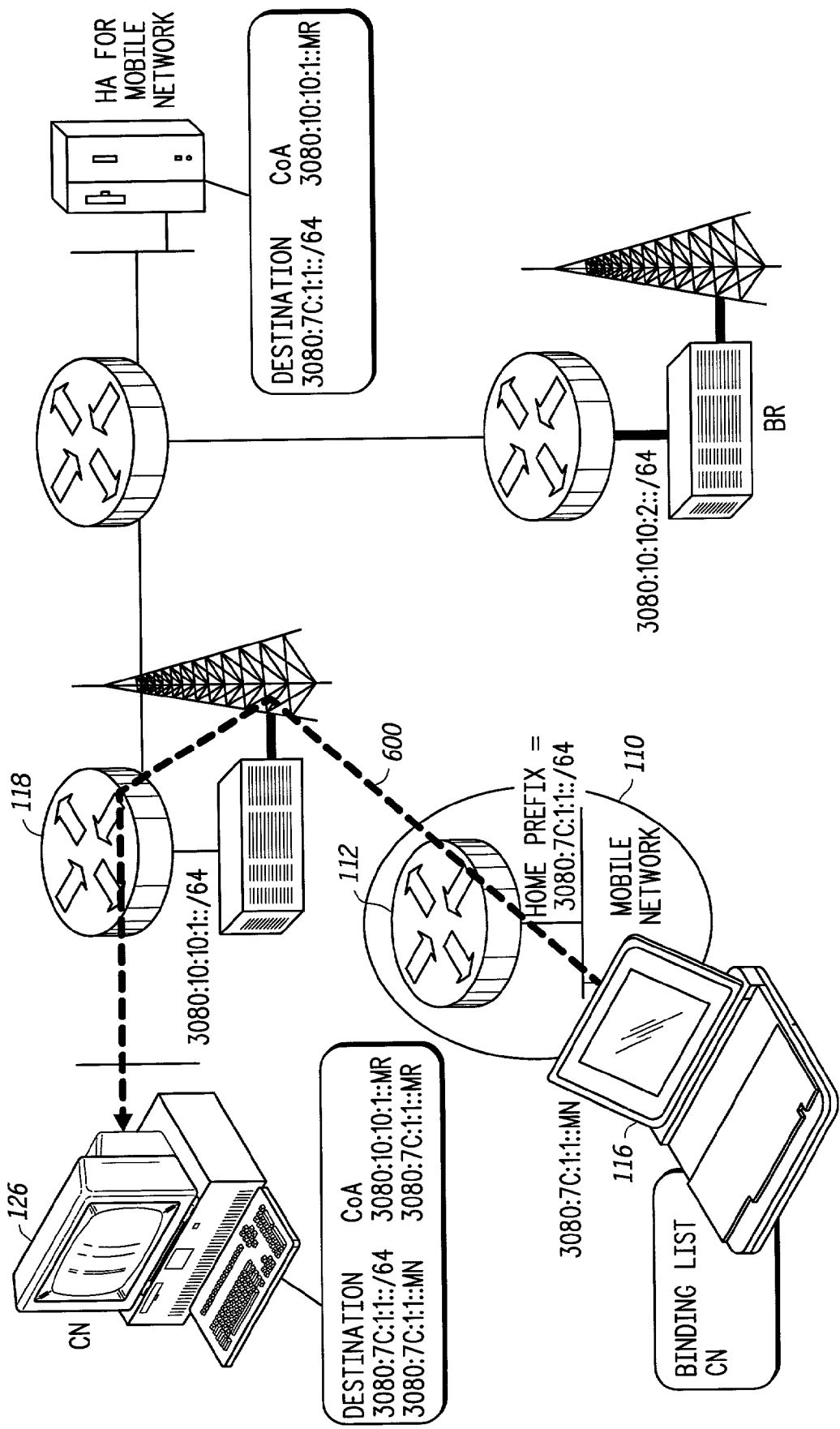

FIG. 6 shows the CN receiving a binding update 600 from the mobile network node 116. The mobile network node 116 determines that a binding update is needed (i.e., that the packets were routed non-optimally from the CN) from the presence of an outer IP header from the mobile router. The binding update 600 maps the home address of the mobile node (3080:7C:1:1:MN) to its RCoA (3080:7C:1:1:MR). The CN stores this information in its binding cache.

The next time the CN sends to the mobile network node, it will search its cache and find an entry for it (3080:7C:1:1: MN) and a care of address 3080:7C:1:1:MR. The CN will perform a "nested lookup" which means it will also check to see if it has an entry in its binding cache to reach the mobile router/network. This search will locate the mobile network prefix entry (received from binding update 502) indicating that the mobile network is reachable by the care of address (3080:10:10:1:MR). The CN will then create an IP header with its own address as the source, the care of address of the mobile router/network (3080:10:10:1:MR) as the destination, and the mobile network node's home address in a router header. Generally, depending on the network topology, the binding cache may contain multiple nested addresses to which packets should be directed to reach a particular mobile node. In such case, the destination is the highest nested address, and the routing header includes any intermediate nested address(es) along with the mobile network node's home address, as will be described in greater detail in relation to FIG. 13 and FIG. 14.

Figure 7:
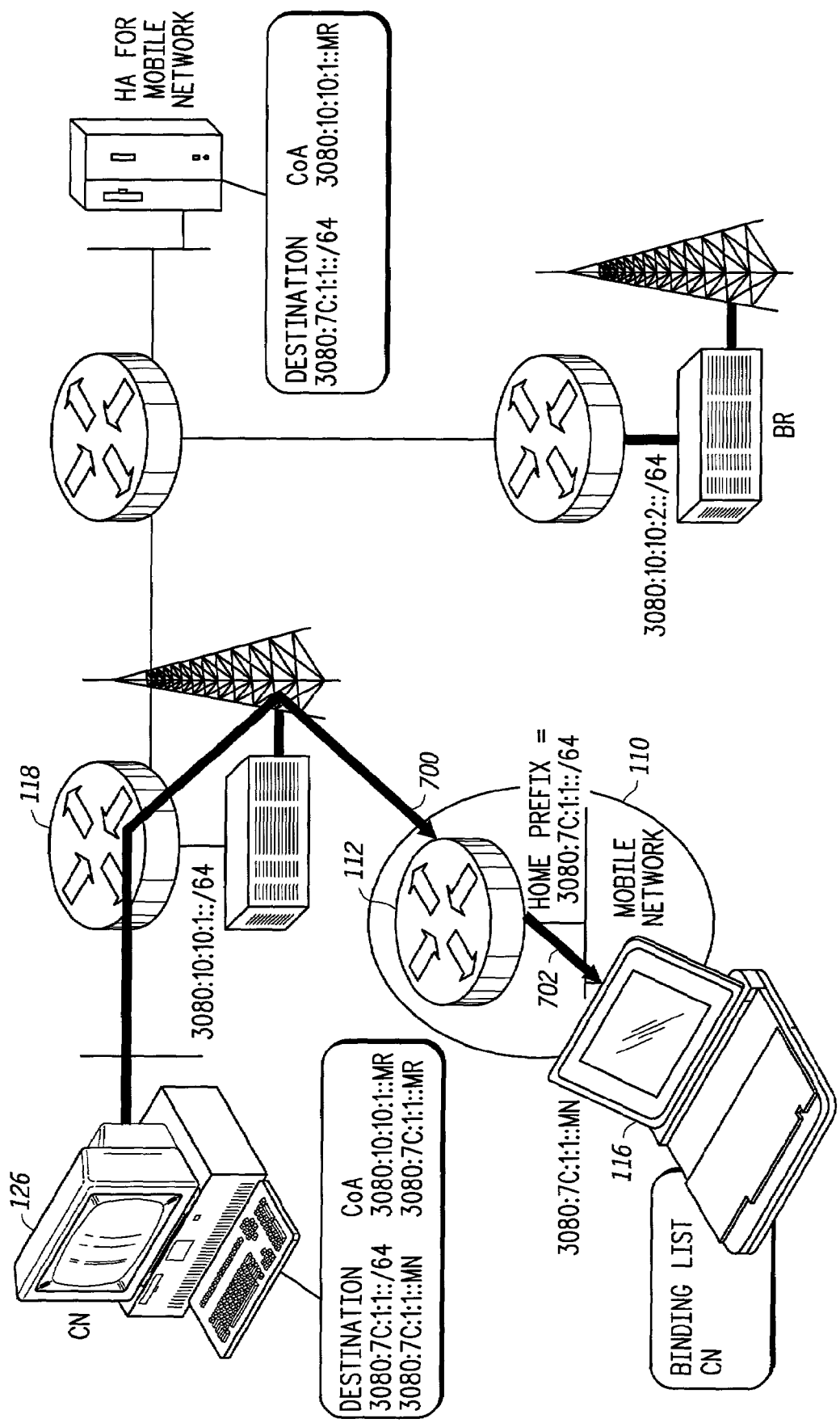

FIG. 7 shows packets 700 including the IP header being routed from the CN to the mobile network node 116 via the mobile router. In the present example, where the mobile network 110 is a home network to the mobile network node, the mobile router 112 upon receiving the packets 700 will do standard routing header processing where it will enter the MNN's home address in a destination field of the IP header. The mobile router will then forward the packets 700 to the MNN via its internal interface. The packet is accepted and processed by the MNN.

It is noted, in the case where the mobile network 110 is a foreign network to the mobile network node, the mobile router 112 may encapsulate the packets in an IP header and tunnel them to the MN, replacing the destination field with the actual address of the MNN. The tunneled packet is received by the mobile network node and the header stripped. The mobile network node then processes the inner packet. The inner packet looks like a normal route-optimized packet, inclusive of the CoA in the destination field and the MNN's home address in the routing header. The packet is accepted and processed by the MNN. In addition, because the MNN finds a router header extension, it determines that the CN routed the packet optimally and thus in this case does not send out a binding update to the CN.

Figure 8:
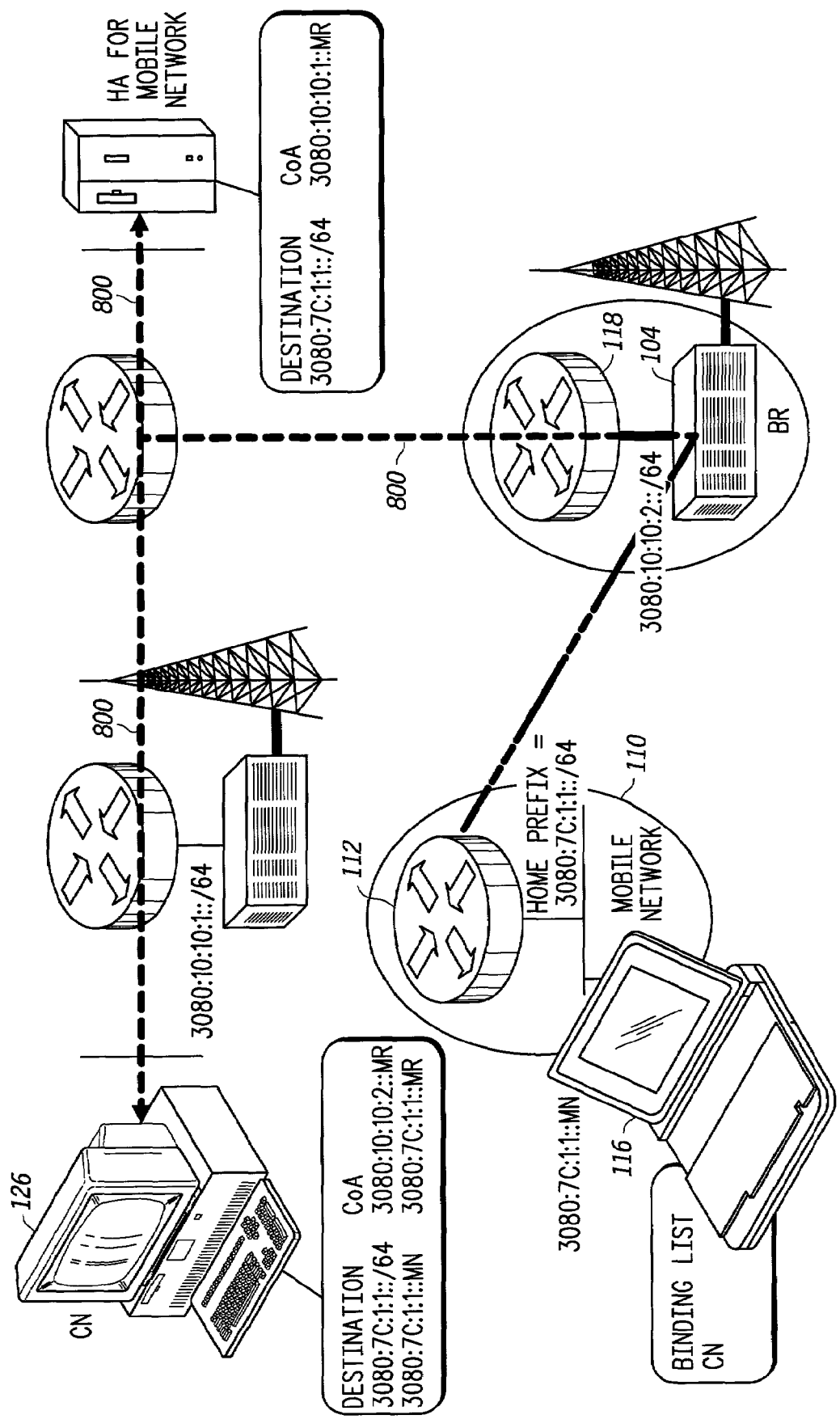

FIG. 8 illustrates a scenario wherein the mobile router 112, with the mobile network node 116 still attached, roams to a different site (e.g., site 2). In the present example, site 2 comprises a fixed site. As will be appreciated, however, the mobile router might also roam into another mobile network. Generally, in either case, the mobile router will receive a router advertisement from the visited site router (or visited mobile router) that identifies the subnet prefix of the visited router. The mobile router configures a new CoA using the advertised prefix. Thus, in the present example, where the subnet prefix of site 2 is 3080:10:10:2::/64, the mobile router configures a new CoA as 3080:10:10:2::MR. The mobile router 112 sends binding updates 800 to its home agent 124 and to the CN 126 mapping its home subnet prefix (3080:7C: 1:1::/64) to its updated CoA 3080:10:10:2::MR. The HA and CN store this information in their respective binding caches, replacing the former CoA with the updated CoA. (The CN still retains the entry associated with the mobile network node, i.e., received when the mobile router was at site 1).

The next time the CN sends to the mobile network node, it will search its cache and find an entry for it (3080:7C:1:1: MN) and a care of address (3080:7C:1:1:MR) (received from binding update 600). The CN performs a nested lookup to determine that it may reach the mobile router/network by the new care of address (3080:10:10:2:MR).

Figure 9:
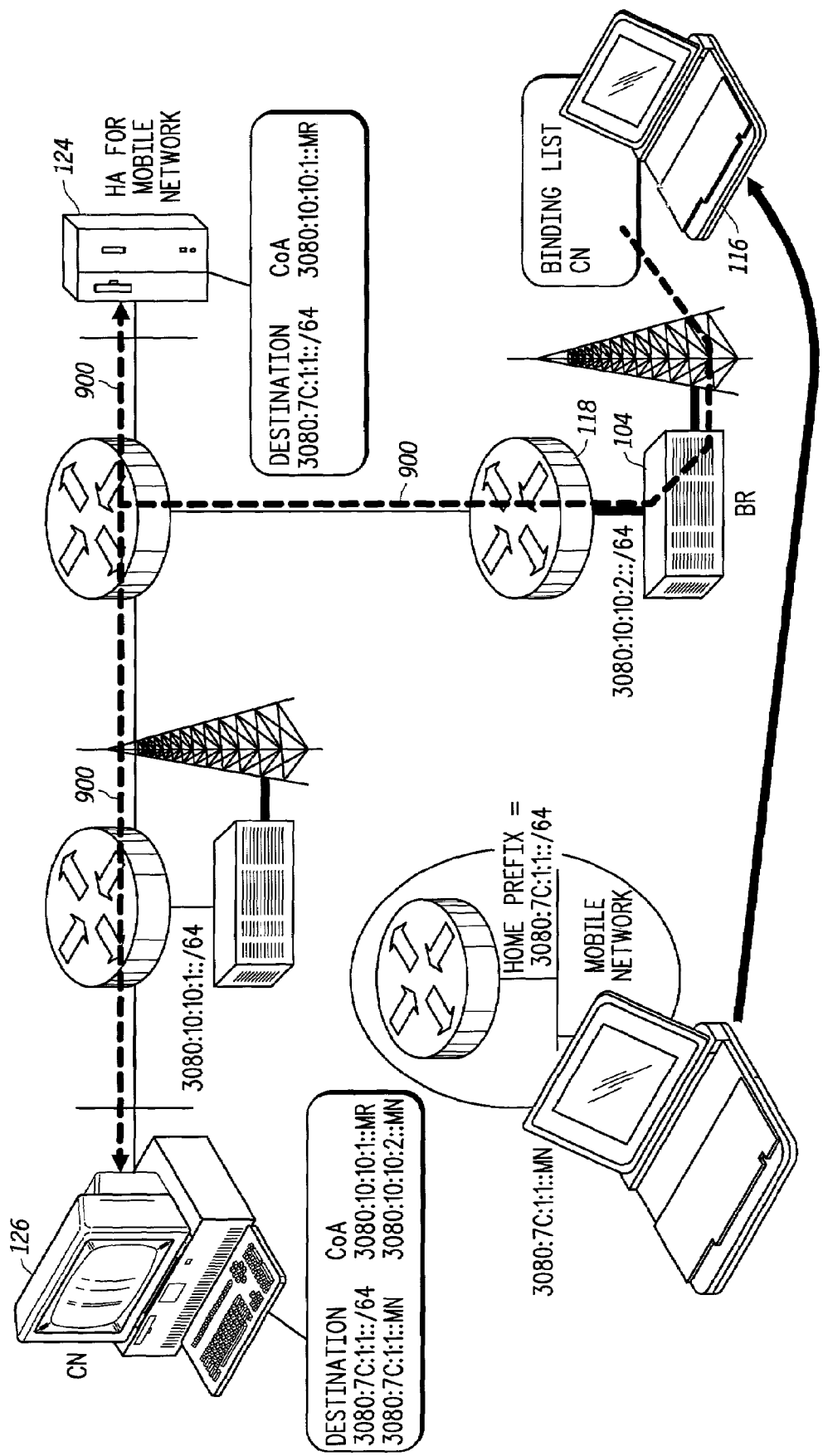

FIG. 9 shows the mobile network node 116 detaching from the mobile router and roaming independently to a fixed site (e.g., site 2). As will be appreciated, the independent mobile node 116 might also roam into another mobile network. Generally, in either case, the mobile node will receive a router advertisement from the visited site router (or visited mobile router) that identifies the subnet prefix of the visited router. The mobile node configures a new CoA using the advertised prefix by adding its host ID to the advertised prefix. Thus, in the present example, where the subnet prefix of site 2 is 3080:10:10:2::/64, the mobile node configures a new CoA as 3080:10:10:2::MN. The mobile node 116 sends binding updates 900 to its home agent 124 and to the CN 126 mapping its home address (3080:7C:1:1::MN) to its updated CoA 3080:10:10:2::MN. The HA and CN store this information in their respective binding caches, replacing the former CoA with the updated CoA. (The CN still retains the entry associated with the mobile router).

Figure 10:
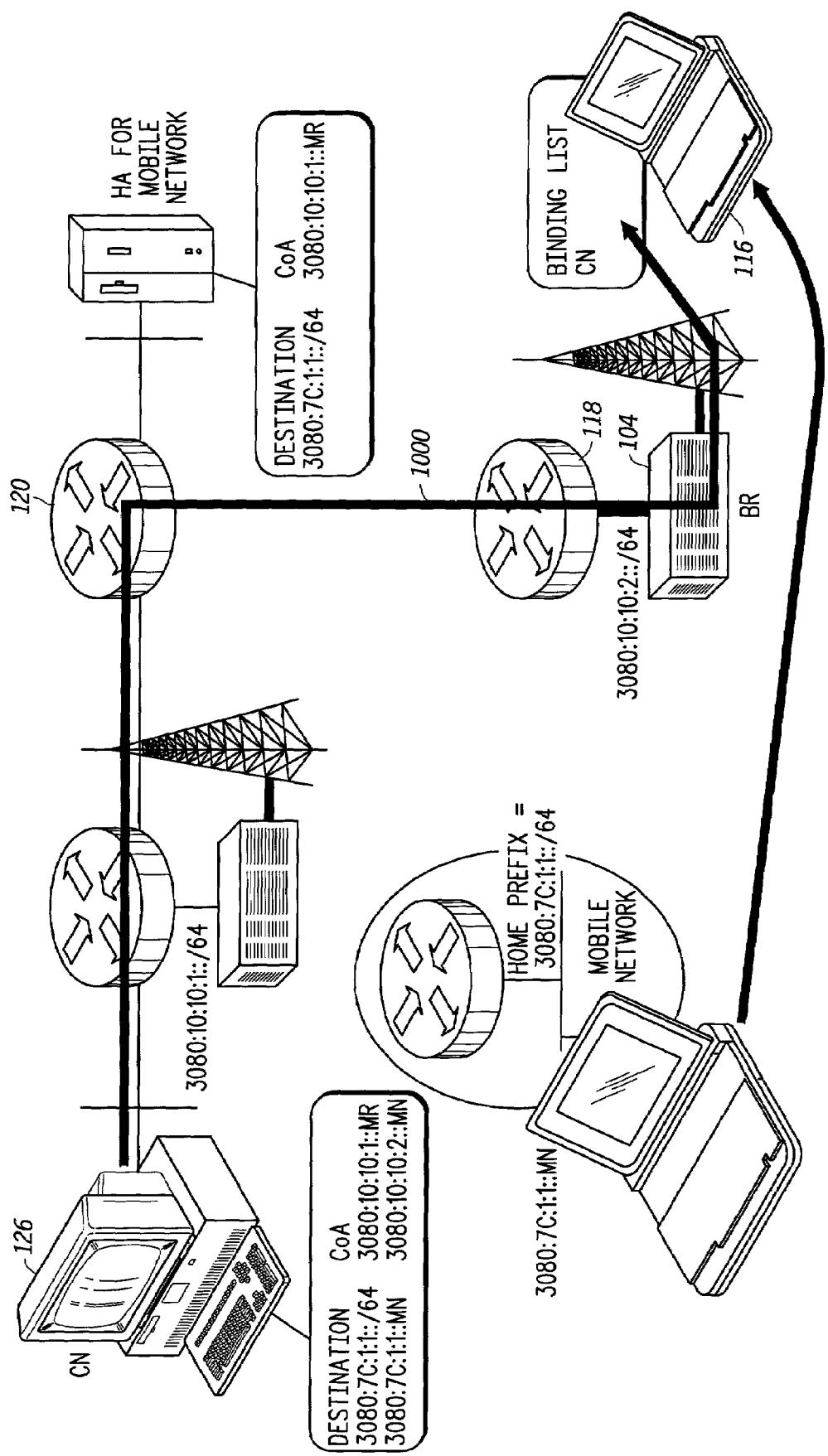

The next time the CN sends to the mobile node, it will search its cache and find an entry for it (3080:7C:1:1:MN) and a care of address (3080:10:10:2:MN). The CN performs a nested lookup and finds no additional nested entries. Then, as shown in FIG. 10, the CN will route packets 1000 to the mobile node via the care of address 3080:10:10:2:MN.

Figure 11:
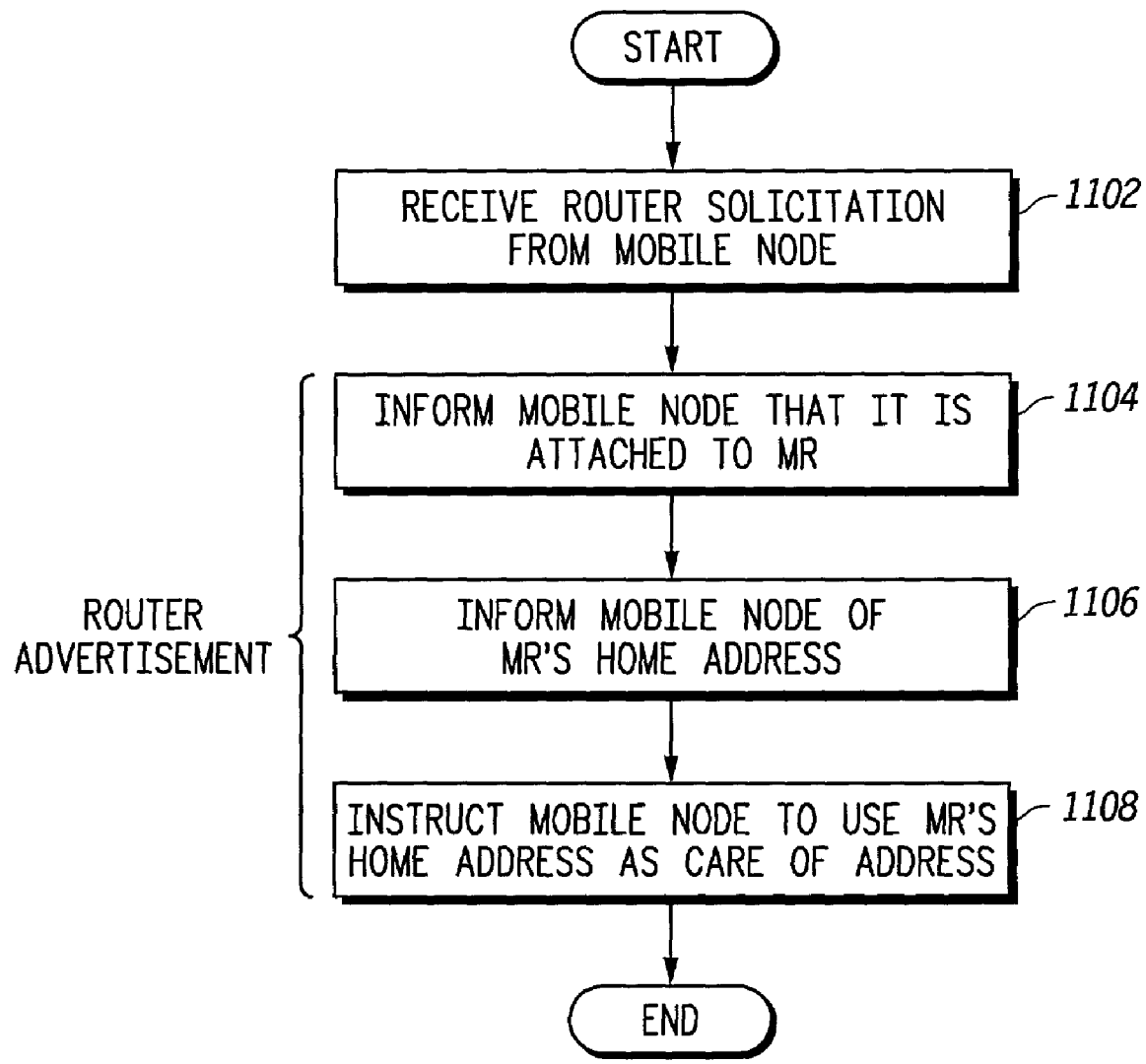
FIG. 11 is a flowchart showing steps performed by a mobile router in communication with a mobile node according to one embodiment of the present invention.

FIG. 11 shows steps performed by a mobile router in communication with an attached mobile node (i.e., via an internal interface of the mobile router). The mobile node may comprise, for example, a mobile network node detached from its home network and now roaming independently to a new mobile router. The mobile node may also comprise a mobile router/network attaching to a second mobile router.

At step 1102, the mobile router receives a router solicitation from the mobile node. In effect, the router solicitation is a query from the mobile node asking for information about the router to which it is attached. In response to the router solicitation, the mobile router returns a router advertisement which, in one embodiment, provides three items of information (represented in FIG. 11 by steps 1104, 1106, 1108) to the mobile node, via a single advertisement message. As will be appreciated, the information provided at steps 1104, 1106, 1108 may also be conveyed via separate messages.

At step 1104, the router advertisement informs the mobile node that it is attached to a mobile router (as opposed to a fixed router). In one embodiment, this is accomplished by setting an "R" bit in the advertisement to TRUE. At step 1106, the router advertisement informs the mobile node of the home address of the mobile router and at step 1108, the router advertisement instructs the mobile node to use the home address of the mobile router as its care of address (e.g., RCoA), as has been described in relation to FIG. 1.

Figure 12:
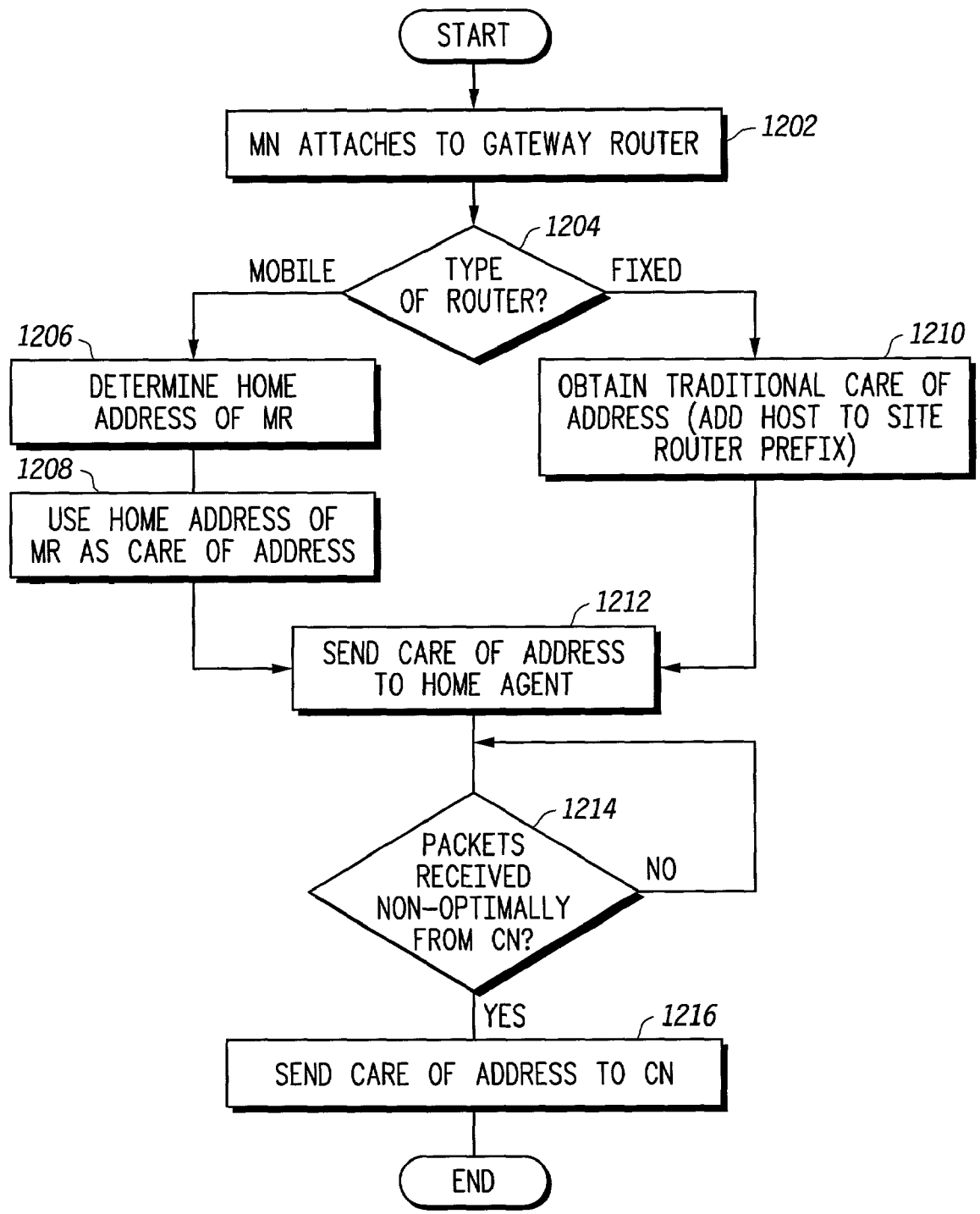
FIG. 12 is a flowchart showing steps performed by a mobile node in communication with a gateway router according to one embodiment of the present invention.

FIG. 12 shows steps performed by a mobile node in communication with a gateway router (i.e., via an external interface of the mobile node). The mobile node may comprise, for example, a mobile network node detached from its home network and now roaming independently to attach to a gateway router or the mobile node may comprise a mobile router/network attaching to a gateway router. The gateway router may comprise a mobile router or a fixed router connecting the mobile node to an IP network infrastructure.

At step 1202, the mobile node attaches to the gateway router. In one embodiment, upon attaching to a gateway router, the mobile node sends a router solicitation and receives a router advertisement substantially as has been described in FIG. 11. The gateway router may be foreign (i.e., having a subnet prefix that differs from the mobile node's home subnet prefix) or a "home" router (i.e., sharing the same "home" subnet prefix as the mobile node). For example, with reference to FIG. 1, site router 1 (having a subnet prefix 3080:10:10:1::/64) is a foreign gateway router for mobile router 112 (having a home subnet prefix 3080:7C:1:1:/64); whereas mobile router 112 is a home gateway relative to mobile network node 116.

At step 1204, the mobile node determines whether the gateway router is mobile or fixed. As has been described with reference to FIG. 11, this may be determined by the presence or absence of an "R" bit in the router advertisement. If the gateway router is mobile, the mobile node determines at step 1206 a home address of the mobile gateway router; and at step 1208 uses the home address of the mobile gateway router as its care of address (e.g., RCoA). If the gateway router is fixed, the mobile node obtains at step 1210 a traditional care of address (i.e., by adding its host ID to the subnet prefix of the foreign gateway router).

At step 1212, the mobile node sends its care of address to its home agent, via a binding update. Some time later, upon receiving packets from a correspondent node, the mobile node is operable to determine, at step 1214, whether it has received the packets non-optimally from the correspondent node. As has been described in relation to FIG. 6, this may be determined by the presence of an outer IP header thereby indicating that the packets were tunneled. If the packets are determined to have been sent non-optimally from the correspondent node, the mobile node sends at step 1216 its care of address to the correspondent node via a binding update. Otherwise, if the packets were sent optimally, the mobile node awaits further packets from other correspondent nodes and again determines at step 1214 whether they were sent optimally, and so on.

Figure 13:
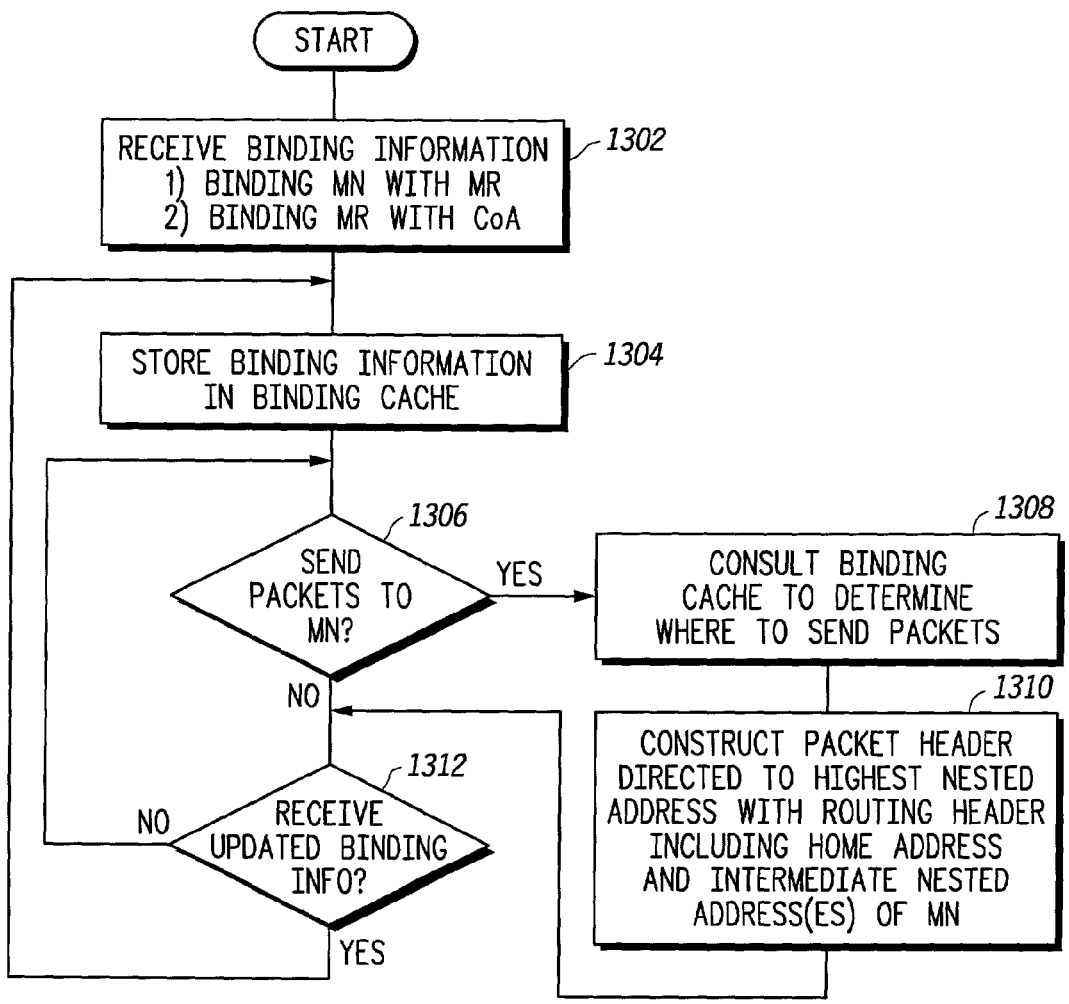
FIG. 13 is a flowchart showing steps performed by a correspondent node in communication with a mobile node that is detachable from a mobile router according to one embodiment of the present invention.

FIG. 13 shows steps performed by a correspondent node in maintaining a binding cache and performing recursive look-ups according to the invention. At step 1302, the correspondent node, responsive to having sent one or more packets non-optimally to a mobile node, receives binding information. Here again, the mobile node may comprise a mobile router or a mobile network node, i.e., an IP-addressable device other than a mobile router.

As will be appreciated, the number of binding entries received will depend on the network topology. Generally, where a mobile node is attached to a mobile router, a CN will receive at least two binding entries—a first entry indicating an association between the mobile node and the mobile router/network and a second entry indicating a proxy address (i.e., care of address) associated with the mobile network. In one embodiment, the first entry maps a home address of the mobile network node (e.g., 3080:7C:1:1::MN) to a home address of a mobile router associated with the mobile network (e.g., 3080:7C:1:1::MR) and the second entry maps a mobile network prefix including the home address of the mobile router (e.g., 3080:7C:1:1::/64) to a care of address (e.g., 3080:10:10:1::MR). Alternatively, the second entry may map the home address of the mobile router (e.g., 3080:7C:1:1::MR) to a care of address (e.g., 3080:10:10:1::MR). Greater than two entries may be received where the mobile node is attached to a mobile router that itself is attached to a mobile router, and so forth; and/or when a mobile node or router moves to a different site or different mobile network.

Further, it will be appreciated that in some instances, the first and second entries may be received responsive to different attempts from the CN, depending on the network topology and/or movement of the targeted mobile node. Generally, the CN will receive binding information whenever an attempted communication with a targeted mobile node results in packets being routed non-optimally to the targeted mobile node. In the case where a CN first attempts to send packets to a targeted mobile node when the mobile node is attached to its home router, the packets will be routed non-optimally on the first attempt but the CN will receive the first and second entries responsive to the first attempt, such that subsequent attempts may be sent optimally. In the case where a CN first attempts to send packets to a targeted mobile node when the mobile node is attached to a foreign mobile network, the CN will receive the "first" entry (i.e., the home address of the mobile network node mapped to a home address of the foreign mobile router) responsive to this first attempt to communicate with the mobile node; but will not receive the "second entry" (i.e., the binding of the home address or mobile network prefix of the mobile network to a care of address) until it has made a second non-optimal attempt to communicate with the mobile node.

At step 1304, the correspondent node stores the binding information in its binding cache. The binding cache will thereby generally include at least two entries. Upon the correspondent node next attempting to send packets to the mobile node (determined at step 1306), the correspondent node consults its binding cache at step 1308 to determine where the packets should be directed to reach the mobile node. Thus, for example, in the case where the mobile node was attached to a mobile router at the time it received packets non-optimally from the correspondent node, the correspondent node will determine based on the first entry that the packets should be directed to the mobile router/network and based on the second entry that the mobile network is reachable by the proxy address.

Figure 14:
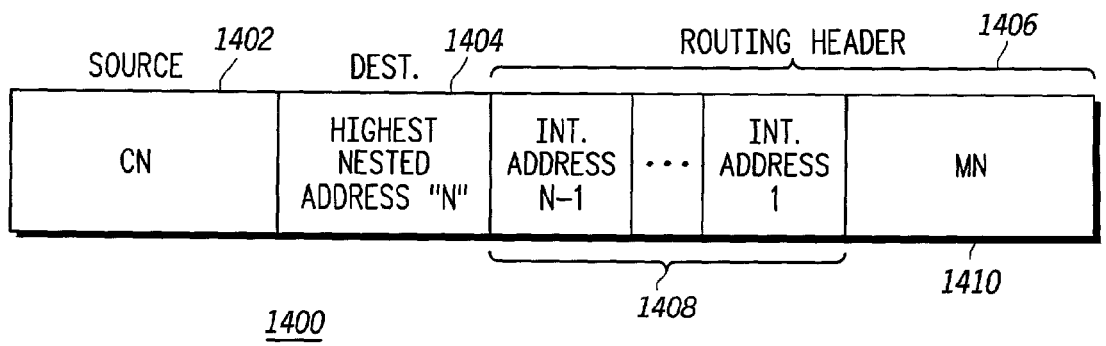
FIG. 14 shows a structure of a packet header sourced by a correspondent node that is to be routed to a mobile node according to one embodiment of the present invention.

At step 1310, the correspondent node constructs a packet header for packets that are to be sent to the targeted mobile node. An example packet header 1400 is shown at FIG. 14. As shown, the packet header 1400 includes a source address field 1402, a destination address field 1404 and a routing header 1406. The source address field 1402 includes a home address ("CN") of the sending correspondent node. The destination address field 1404 includes a highest nested address "N" (of "N" nested entries) in the binding cache. For example, in the case where a CN has a first and second nested entry, the first entry binding a home address of the mobile network node (e.g., 3080:7C:1:1::MN) to a home address of a mobile router associated with the mobile network (e.g., 3080:7C:1:1::MR) and the second entry binding a mobile network prefix including the home address of the mobile router (e.g., 3080:7C:1:1::/64) to a care of address (e.g., 3080:10:10:1::MR), the destination address field will include the care of address identified in the second entry.

The routing header 1406 will include one or more intermediate address fields 1408 and a target address field 1410. The target address field includes a home address ("MN") of the targeted mobile node. The intermediate address field include any intermediate nested address(es) between the targeted mobile node and the destination address identified in the destination field 1404. Thus, continuing the example above, where the CN has a first and second nested entry, packet(s) directed to the mobile node will have a single intermediate address field 1408 including the home address of the mobile router identified in the first entry.

Generally, therefore, where the CN has received a first address identifier associated with a mobile network node and a second address identifier associated with a mobile router attached to the mobile network node, the routing header 1406 (or more particularly, an intermediate address field 1408 of the routing header) will include the first address identifier and home address of the targeted mobile network node, and the destination address field 1404 will include the second address identifier.

As yet another example, if the mobile router is attached to a second mobile router, the CN will have received a third address identifier from the second mobile router. In such case, the routing header 1406 will include two intermediate address fields 1408—containing the first and second address identifiers, respectively—and the destination address field 1404 will include the third address identifier.

If the CN receives updated binding information (determined at step 1312), it stores the updated information in its binding cache at step 1304. Then, upon the correspondent node next attempting to send packets to the mobile node (determined at step 1306), the correspondent node consults its binding cache at step 1308 to again determine where the packets should be directed to reach the mobile node, using the updated binding information. Updated binding information may be received responsive to the CN sending packets non-optimally to a targeted mobile node, as previously described, or responsive to the mobile node roaming to a visited network. The visited network may comprise, for example, a fixed site/network or mobile network. The mobile node may comprise an independent mobile node or mobile network.

For example, returning briefly to FIG. 9, consider the case of the mobile node 116 detaching from its home mobile network, thereby becoming an independent mobile node, and attaching to a fixed site (e.g., site 2). In such case, the mobile node 116, having received packets non-optimally from the CN 126 while the mobile node was attached to its home mobile network, maintains a binding list having the CN 126 identified as one of its correspondent nodes. Consequently, the mobile node knows to send updated binding information to CN 126 upon attaching to site 2 informing the CN 126 of the mobile node's association with site 2. In effect, the updated binding information defines an updated "first entry" for the CN binding cache inasmuch as the former first entry indicated an association between the mobile node 116 and the mobile router 112 and the updated information indicates the mobile node is now associated with site 2. In one embodiment, the updated first entry maps a home address of the mobile node to a care of address of the visited site. The CN replaces the former first entry with the updated first entry in its binding cache. Then, upon the CN next attempting to send packets to the mobile node, the CN consults the binding cache to determine based on the updated first entry that the packets should be directed to the care of address of the visited site.

As another example, consider the case of a mobile network node detaching from its home mobile network and moving to a second mobile network. In such case, the mobile node will again have maintained a binding list identifying its correspondent nodes and will send binding information to its correspondent nodes upon attaching to the second mobile network. Again, the updated binding information effectively defines an updated "first entry" for the CN binding cache. In one embodiment, the updated first entry maps a home address of the mobile node to a home address of a mobile router of the second mobile network. The CN replaces the former first entry with the updated first entry in its binding cache. Then, upon the CN next attempting to send packets to the mobile node, the CN consults the binding cache to determine based on the updated first entry that the packets should be directed to the home address of the mobile router of the second mobile network.

In one embodiment, packets so-directed on a next attempt are intercepted and tunneled to the second mobile network by the second network's home agent. Thus, the packets are routed non-optimally, causing the CN to receive additional binding information from the second network's home agent. In one embodiment, this additional binding information informs the CN of a care of address, or proxy address for reaching the second mobile network. The CN stores this information in its binding cache, thereby defining a third entry. Then, upon the CN next attempting to send packets to the mobile node, it consults its binding cache to determine, based on the updated first entry, that the packets should be directed to the second mobile network and, based on the third entry, that the second mobile network is reachable by the proxy address.

The present disclosure has identified a mobility solution that allows a mobile network node to detach from its mobile network and roam to another mobile network or a fixed network. The solution builds on top of and is interoperable with mobile-IPv6 and/or hierarchical mobile IPv6. The invention provides for a mobile network node doing minimal mobility management while attached to a mobile network, hence the mobile network node need not be aware of movement of the mobile network while it is attached to the mobile network, yet the invention provides enough mobility management to allow the mobile network node to detach from the mobile network and send appropriate binding updates to its correspondent nodes. While attached to the mobile network, the mobile node need only send a single binding update indicating its attachment to the mobile network. Binding updates indicating mobility of the mobile network are the responsibility of a mobile router. Thereafter, correspondent nodes desiring to reach the mobile node perform a "nested lookup" of entries from the mobile node and mobile router to determine how to reach mobile nodes whether they are at a home mobile network, visited mobile network or fixed site.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A system including a mobile node operable to connect to a network infrastructure via a mobile gateway router, the system comprising:
   a home mobile gateway router of a mobile node operable to send a binding update with Internet Protocol (IP) address information including that of the mobile node to a correspondent node; and
   the mobile node, while in its home network, operable to determine that it is in its home mobile network and to create a new binding list entry with information about the correspondent node, and further operable to send a binding update to the correspondent node with information about its new point of attachment upon leaving its home mobile network.

2. The system of claim 1, wherein the mobile gateway router operates outside of the home movile network of the mobile node.

3. The system of claim 1, wherein the mobile node comprises a mobile router.

4. The system of claim 1, wherein the mobile node comprises a mobile network node detached from a mobile network.

5. The system of claim 1, wherein the mobile node comprises an IP-addressable device.

6. The system of claim 1, wherein the binding update is generated in response to a tunneled packet from at least one of a) the one or more correspondent nodes, b) the mobile gateway router, and c) a home agent of the mobile node.

7. The system of claim 1, wherein the mobile node is further operable to identify that a packet was received from the one or more correspondent nodes without traversing a home agent.

8. The system of claim 1, wherein the new point of attachment comprises a gateway router in a fixed site in the network infrastructure.

9. The system of claim 1 wherein the binding update comprises a care of address in a subnet of the new point of attachment.

10. The system of claim 1 wherein the binding update comprises a care of address of a home address of the mobile gateway router of the new point of attachment.

11. The system of claim 1, wherein the mobile node is further operable to:
   detach from the mobile gateway router;
   attach to a second mobile gateway router in a second mobile network,
   wherein the new point of attachment comprises the second mobile network.

12. The system of claim 1 wherein when the mobile node has moved away from the home network, the movile node is further operable to:
   obtain a care of address comprising the home address of the mobile gateway router; and
   send the care-of address to a home agent of the mobile node.

13. The system of claim 12, wherein the care of address comprises at least one of a home address of a) the mobile gateway router and b) the mobile node.

14. The system of claim 12, wherein the care of address comprises an address in a home subnet of the mobile node.

* * * * *

UNITED STATES PATENT AND TRADEMARK OFFICE
CERTIFICATE OF CORRECTION

PATENT NO. : 7,561,553 B2  
APPLICATION NO. : 10/083890  
DATED : July 14, 2009  
INVENTOR(S) : Venkitaraman et al.

Page 1 of 1

It is certified that error appears in the above-identified patent and that said Letters Patent is hereby corrected as shown below:

IN THE SPECIFICATION

1. In Column 4, Line 29, delete "addressess" and insert -- addresses --, therefor.

IN THE CLAIMS

2. In Column 13, Line 31, in Claim 2, delete "movile" and insert -- mobile --, therefor.

3. In Column 14, Line 26, in Claim 12, delete "movile" and insert -- mobile --, therefor.

Signed and Sealed this  
Sixth Day of September, 2011

David J. Kappos  
*Director of the United States Patent and Trademark Office*